US006857352B2

(12) United States Patent  
Fischer (10) Patent No.: US 6,857,352 B2  
(45) Date of Patent: Feb. 22, 2005

(54) APPLIANCE FOR PREPARING HOT BEVERAGES

(75) Inventor: Daniel Fischer, Romanshorn (CH)

(73) Assignee: Eugster/Frismag AG, Romanshorn (CH)

( * ) Notice: Subject to any disclaimer, the term of this patent is extended or adjusted under 35 U.S.C. 154(b) by 0 days.

(21) Appl. No.: 10/814,298

(22) Filed: Apr. 1, 2004

(65) Prior Publication Data

US 2004/0182248 A1 Sep. 23, 2004

Related U.S. Application Data

(63) Continuation of application No. 10/697,568, filed on Oct. 31, 2003, now abandoned.

(30) Foreign Application Priority Data

Nov. 8, 2002 (DE) ...................................... 202 17 408 U (51) Int. Cl.[7] .......................... A47J 31/06; A47J 31/24; A47J 31/40; A23L 1/00
(52) U.S. Cl. ............................ 99/280; 99/283; 99/285; 99/289 R; 99/295; 99/302 R; 99/495
(58) Field of Search .................. 99/495, 516, 279–283, 99/285, 289 R, 289 D, 289 P, 291–315, 323.3; 392/465, 471, 480, 484, 467, 502, 479; 219/506; 426/433, 435, 77, 144, 595, 112

(56) References Cited

U.S. PATENT DOCUMENTS 3,209,676 A * 10/1965 Zimmermann et al. ... 99/289 R
3,975,996 A * 8/1976 Vitous .......................... 99/495
5,337,652 A * 8/1994 Fischer et al. ................ 99/282
5,357,848 A * 10/1994 Eugster et al. ................ 99/279
5,443,555 A * 8/1995 Fischer ........................ 99/295
5,531,152 A * 7/1996 Gardosi .................... 99/289 R
5,794,519 A * 8/1998 Fischer ........................ 99/495
5,826,492 A * 10/1998 Fond et al. .................... 99/495
5,843,311 A * 12/1998 Richter et al. .............. 210/634
6,068,871 A * 5/2000 Fond et al. ................. 426/433
6,393,967 B2 * 5/2002 Fischer ........................ 99/495
6,698,332 B2 * 3/2004 Kollep et al. ............. 99/289 R
6,725,762 B2 * 4/2004 Kollep et al. ................. 99/283

FOREIGN PATENT DOCUMENTS

DE 698 07 359 T2 4/2003
EP 1 050 258 A1 11/2000

* cited by examiner

Primary Examiner—Timothy Simone
(74) Attorney, Agent, or Firm—Venable, LLP; Robert Kinberg (57) ABSTRACT

An appliance for preparing hot beverages includes a brewing chamber having an essentially cylindrical outside and at least two chamber parts. One of the chamber parts is movable relative to the other chamber part between a closed position and an opened position. The chamber parts holding a portion container in the closed position. A sleeve having an inside wall is adapted to the essentially cylindrical outside of the brewing chamber. At least two sealing rings for sealing the brewing chamber, encircle a respective one of the chamber parts. The sleeve is pushable over the outside of the brewing chamber in the closed position. Each sealing ring provides a seal between the inside wall of the sleeve and the outside of the brewing chamber.

14 Claims, 8 Drawing Sheets

APPLIANCE FOR PREPARING HOT BEVERAGES

CROSS-REFERENCE TO RELATED APPLICATION

This application is a continuation of U.S. application Ser. No. 10/697,568, filed Oct. 31, 2003, now abandoned, and claims the priority of German Patent Application No. 202 17 408.5 filed Nov. 8, 2002, which was also claimed in the parent application. The subject matter of both foregoing applications is incorporated herein by reference.

BACKGROUND OF THE INVENTION

The invention relates to an appliance for preparing hot beverages, in particular coffee and espresso, which has a two-part brewing chamber that can hold or release a portion container.

The portion containers used in the known appliance are filter bags, so-called pouches, which, for the most part, have a flat, lens-shaped or pot-shaped design and consist of either filter paper or woven plastic material with coffee grounds sealed therein. The portion containers may also consist of deep-drawn aluminum or plastic foil drawn into the shape of a pot and provided with a lid.

For the purpose of preparing coffee, these portion containers, in particular the filter bags, are inserted into the two-part brewing chamber of the appliance composed of an upper chamber part and a lower chamber part. Following the insertion of the portion container, the brewing chamber is sealed pressure-tight and water-tight with the exception of a brewing-water intake line and a brew discharge line. During the brewing process, brewing water enters the brewing chamber under pressure and, if the filter bags are made from a filtering material, flows directly through the filter bags in the brewing chamber. In the brewing process, the brewing water leaches out the coffee grounds and flows in the form of the brewed beverage via the brew discharge line into a collection container. For the water-tight sealed portion container, additional means are provided in the brewing chamber which partially pierce or open up the container lid as well as the container bottom during the closing of the brewing chamber or during the brewing operation, either mechanically or through the pressure exerted by the brewing water.

The problem with the appliance is that when the brewing chamber is sealed with the portion container positioned therein, the brewing water may circumvent the portion container and leave the brewing chamber directly. The preferred result is that the brewing water flows completely, if possible, through the portion container, such that the total contents are leached out uniformly. It is assumed here that the portion containers, or the pouches and portion capsules, are provided with a circumferential collar, which, in the case of pouches, is an area where the upper portion and the lower portion are welded together, and for the portion capsules, is an area formed by a closing zone between the lid and pot. The collar of the portion capsules functions as a sealing surface between the upper portion and the lower portion of the brewing chamber. However, it has turned out that sealing the brewing chamber with a welded collar is not reliable in the case of pouches since the filter materials have a tendency to form folds after they are filled with the coffee grounds because of their insignificant deep-drawing capacity. This can result in an uneven collar structure when the upper and the lower parts are welded together and can lead to leakages in the brewing chamber during the brewing operation.

The known appliance is designed for use with pan-shaped filter bags that can also be considered as the pouches. The brewing chamber of the known appliance comprises a filter container as a lower part consisting of a pan-shaped inside space with a bottom that is lowered relative to the edge and a vertical, cylindrically closed, side wall that surrounds the edge (see German patent document DE 698 01 081 T2). A number of groove-shaped indentations are provided at the bottom, which extend in a radial direction toward a discharge opening. The lower part with inserted filter bag can be closed off with a flat lid as the upper part. The filter container with the lid forms the brewing chamber. In addition, the lid is provided with a sealing ring along its outer edge that moves radially outward under the pressure of the brewing water and fits itself against the vertical side wall of the filter container. The brewing water should flow through the filter bag from the top toward the bottom and out of the filter bag at those locations where the grooves are arranged. In contrast, only a small amount of brew should exit the filter bag in the areas between the grooves so that on the whole the brew does not flow too fast through the filter bag. In addition, the brewing water flowing into the filter container should not flow toward the outlet opening without first passing through the coffee grounds in the filter bag. For this, the bottom of the filter bag must be fitted directly over the bottom of the filter container area without grooves. The filter bag collar can be positioned below the sealing ring. Since this ring is arranged inside the brewing chamber, it is impossible to avoid that coffee particles are deposited in the area of the seal, thus resulting in leaks in the brewing chamber without careful cleaning.

The sealing ring of a known appliance is positioned inside the side wall of the filter container, and the filter container bottom can be provided with a larger number of cylindrical projections in place of the radial grooves. However, the sealing problem is still not solved. In both cases, it is possible that the brewing water does not completely penetrate the filter bag on the supply side, but flows past the filter bag. Additionally, the filter bag or the pouch must be inserted precisely into the pan-shaped inside space of the filter container and is difficult to remove following use.

SUMMARY OF THE INVENTION

It is an object of the present invention to provide an appliance for preparing hot beverages which facilitates the insertion of a fresh pouch into the filtering chamber and the removal of a used pouch from the chamber with an improved seal that requires low maintenance.

The above and other objects are accomplished according to the invention by the provision of an appliance for preparing hot beverages, comprising: a brewing chamber having an essentially cylindrical outside and at least two chamber parts, one of the chamber parts being movable relative to the other chamber part between a closed position and an opened position, the chamber parts holding a portion container in the closed position; a sleeve having an inside wall that is adapted to the essentially cylindrical outside of the brewing chamber; and at least two sealing rings for sealing the brewing chamber, each of the sealing rings encircling a respective one of the chamber parts; wherein the sleeve is pushable over the outside of the brewing chamber in the closed position, and each sealing ring provides a seal between the inside wall of the sleeve and the outside of the brewing chamber.

Accordingly, the two-part brewing chamber is supplemented with a displaceable sleeve which, in connection with the two sealing rings which respectively encircle a closed circular cylindrical section of one of the two chamber parts, provides a tight seal of the brewing chamber in the assembled brewing chamber. Due to the fact that the seal has been located at the outside of the brewing chamber, the inside of the two brewing chamber parts for the most part can be designed freely, in particular to permit an easy but functionally correct insertion of the pouches and, if desired, automatic removal of the used pouches following the brewing operation.

In the opened position of the brewing chamber, the sleeve is positioned away from the point where the movable chamber part separates from the chamber part attached immovably to the appliance, so that the movable chamber part can move unhindered, i.e., it can be pivoted or displaced in a linear movement, depending on the preferred embodiment. If the brewing chamber is in the closed position, the sleeve is pushed far enough over the separation point to cover and seal the respective sealing rings on the movable chamber part and the chamber part that can be immovably attached to the housing. In order to open the brewing chamber following the brewing operation, the sleeve can be pushed back again. In the pushed back position of the sleeve one of the two sealing rings can rest on one of the chamber parts, preferably the immovable one. As a result of the sliding movement of the sleeve over the sealing rings, the sealing locations are cleaned automatically.

Preferably the sleeve is linked to the movable brewing chamber part so that the sleeve is displaced automatically without requiring the attention of an operator. The sleeve and the movable chamber part is guided to be forcibly fitted together with the other chamber part or to be separated apart, and the link allows the sleeve to be pushed over at least the movable chamber part after the chamber parts are fitted together to create the seal without the attention of the operator.

The present invention provides a particularly simple arrangement for the two sealing rings. The two sealing rings in this case are inserted into the circular cylindrical outside wall section of the two chamber parts, respectively, and the inside wall of the sleeve that acts jointly with the sealing rings has a simple design that is essentially cylindrical and continuously smooth without grooves or the like. However, it is also possible to install the sealing rings on the inside of a sleeve, e.g., a composite sleeve, and to allow these to act jointly with continuously cylindrical wall sections of the chamber parts. In that case, the sealing ring for sealing the movable chamber part must be pushed over the separation location.

The brewing chamber can be divided essentially in the middle and includes a movable chamber part comprising an essentially planar lower inside surface and the first half of the brewing chamber and a chamber part that can be immovably attached to the appliance comprising an essentially planar upper inside surface and the second half of the brewing chamber. A pouch can be inserted without problem into the opened, divided brewing chamber. A pouch that is placed only approximately in the desired position onto the lower inside surface of the movable chamber part is automatically positioned between the two halves of the brewing chamber when the movable chamber part is joined with the chamber part immovably attached to the appliance. The used pouches can be removed particularly easily by pushing them out of the lower planar inside surface. The shape of the lower planar inside surface and the upper planar inside surface can be adapted to the shape of the pouch. The brewing chamber is sealed at the outside at the closed wall sections around the planar inside of the brewing chamber, which are encircled by the sleeve.

The placement of the pouches onto the movable chamber part is not hindered by the pushed-back sleeve. The sleeve is pushed back far enough over the immovable chamber part so that the movable chamber part is exposed and the chamber parts are in the opened position. Once the sleeve is pushed back past the locally fixed chamber part, it does not need to be moved jointly with the chamber part for the closing or opening of the brewing chamber.

The appliance of the present invention may further contain a scraper blade that is advantageously installed in the traversing region for the movable chamber part which automatically removes the used pouch from the movable chamber part into a waste container positioned underneath, while the movable chamber part is moved to the opened position for accepting the next pouch. The scraping operation is not hindered by the planar inside surface of this chamber part and the first half of the brewing chamber, because it is provided with an opening through which the scraper blade can extend. If this chamber part moves in the opposite direction, the scraper blade is not operational and the pouch that is deposited for the brewing operation can be moved without problem to the second chamber part. The scraper blade may be arranged in a movable region of the movable chamber part and activated upon moving of the movable chamber part from the closed position to the opened position. Alternatively, the scraper blade may be positioned on a support that is connected to the housing for the appliance, and the scraper blade is pivoted against an end stop. The scraper blade may also be positioned on the sleeve and pivoted against an end stop.

The scraper blade which facilitates the use of the appliance can be positioned structurally uncomplicated on a support that is locally connected to the appliance housing, or can be positioned pivoting on the sleeve, such that it hits an end stop and/or an end stop surface thereon. Thus, it is effective as a scraper blade for removing the used pouch if the pouch hits the scraper blade while the movable chamber part moves toward the opened position. In contrast, if a pouch deposited for the following brewing operation hits the scraper blade during the movement toward the closed position of the brewing chamber, the scraper blade is pivoted back without problem and becomes ineffective.

To ensure that all the brewing water supplied to the brewing chamber flows through to the pouch containing the coffee grounds or other aroma carriers, the appliance further contains at least one nub-shaped elevation having a brewing-water feed bore which projects from one of the two inside surfaces of one of the two chamber parts. The pouch inserted into the filtering chamber closely rests against this nub-shaped elevation or elevations during the brewing operation, thus causing a wetting of the pouch at locations that ensure a defined penetration of the brewing water into the pouch. The close fit of the pouch against the nub-shaped elevation can be further enhanced by the pressure that builds inside the pouch. The brewing water can optionally be supplied either to the lower movable chamber part or to the upper chamber part that can be attached immovably to the appliance, provided it is designed for this purpose. The inside surface of the brewing chamber which is positioned opposite the brewing-water feed location and is formed by the other chamber part, is preferably designed with concentrically arranged annular grooves, positioned at a distance to the outer edge of the inside surface. These grooves are connected to at least one brew discharge line. The brew can leave the filter container inside in a uniform flow along the annular grooves and by overcoming a defined flow resistance after the brewing water has for the most part passed homogeneously through the coffee grounds or other aroma carrier. On the other hand, the pouch fits closely against the inside surface areas that do not contain depressions in the form of the annular grooves, so that practically no brew can leave the filtering material. The sealing effect can be used in the edge region of the pouch.

The uniform flow of water through the coffee grounds or other aroma carrier in the brewing chamber during the brewing operation can be promoted considerably by installing a spring in the appliance of the present invention. The inside space of the brewing chamber, i.e., the brewing space, expands, as at least one chamber part is displaced relative to the other chamber parts due to the pressure from the brewing water counter to the spring force until a spring-loaded frothing valve that is installed downstream of the brewing chamber opens up. Then, the brewing chamber pressure is released and the brewing operation is completed. The brewing chamber is sealed, even during its maximum expansion under the brewing water pressure within the sleeve sealing region that is defined by the axial distance between the sealing rings.

To prevent the brewing water from entering the brewing chamber while the brewing chamber is not yet fitted together and sealed by the sleeve, the present invention further provides a safety device to which the movable chamber part, the sleeve, or both, is connected. The safety device blocks the brewing water supply in case of such a malfunction.

The appliance of the present invention may further contain a programmable flow-through control for programming the amount of brewing water. The programmable flow-through control for the brewing water is provided to reliably adapt the desired coffee amount to the size of the collection container.

BRIEF DESCRIPTION OF THE DRAWINGS

The invention is explained in the following with the aid of three exemplary embodiments and nine figures.

In all Figures same elements have identical reference signs.

DETAILED DESCRIPTION OF THE DRAWINGS

Figure 1:
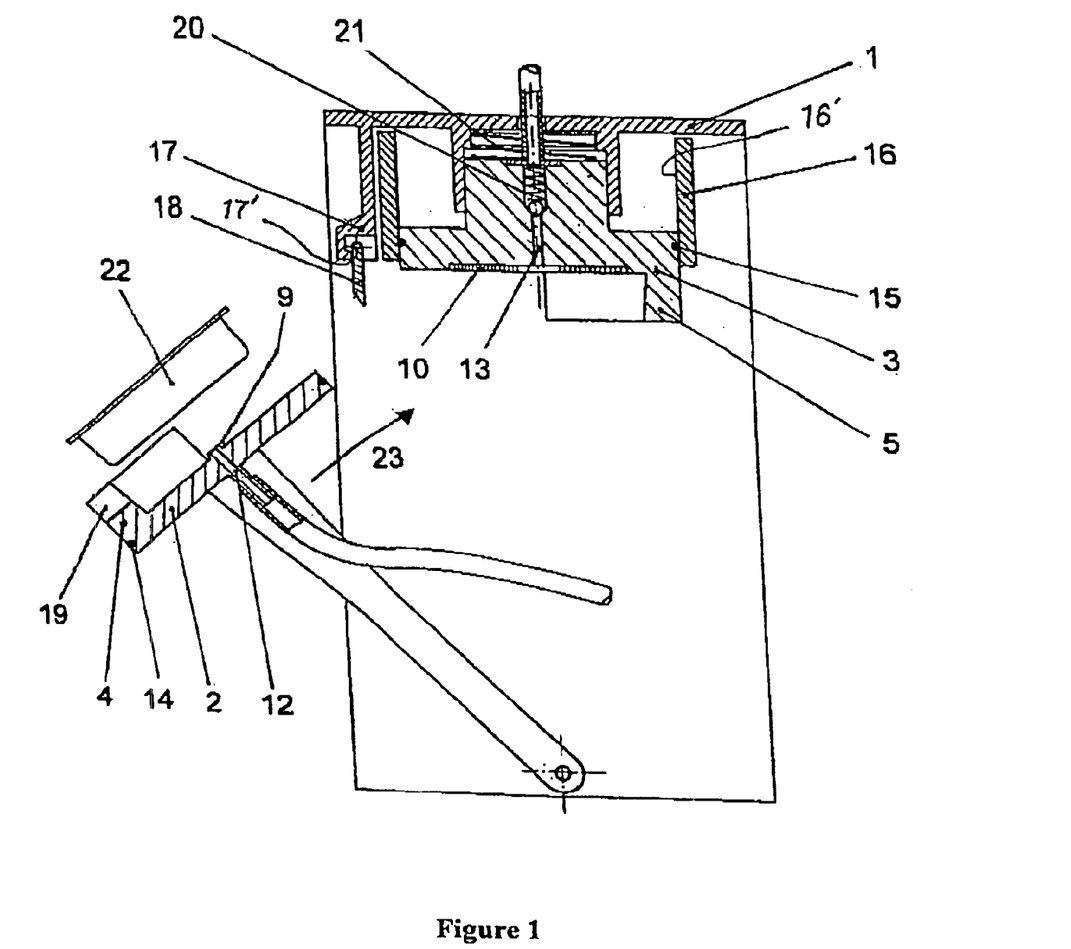
FIG. 1 is a sectional side view which shows the appliance of the present invention with the chamber parts in the opened position, the sleeve pulled up, and a pouch to be inserted into the brewing chamber.
Figure 2:
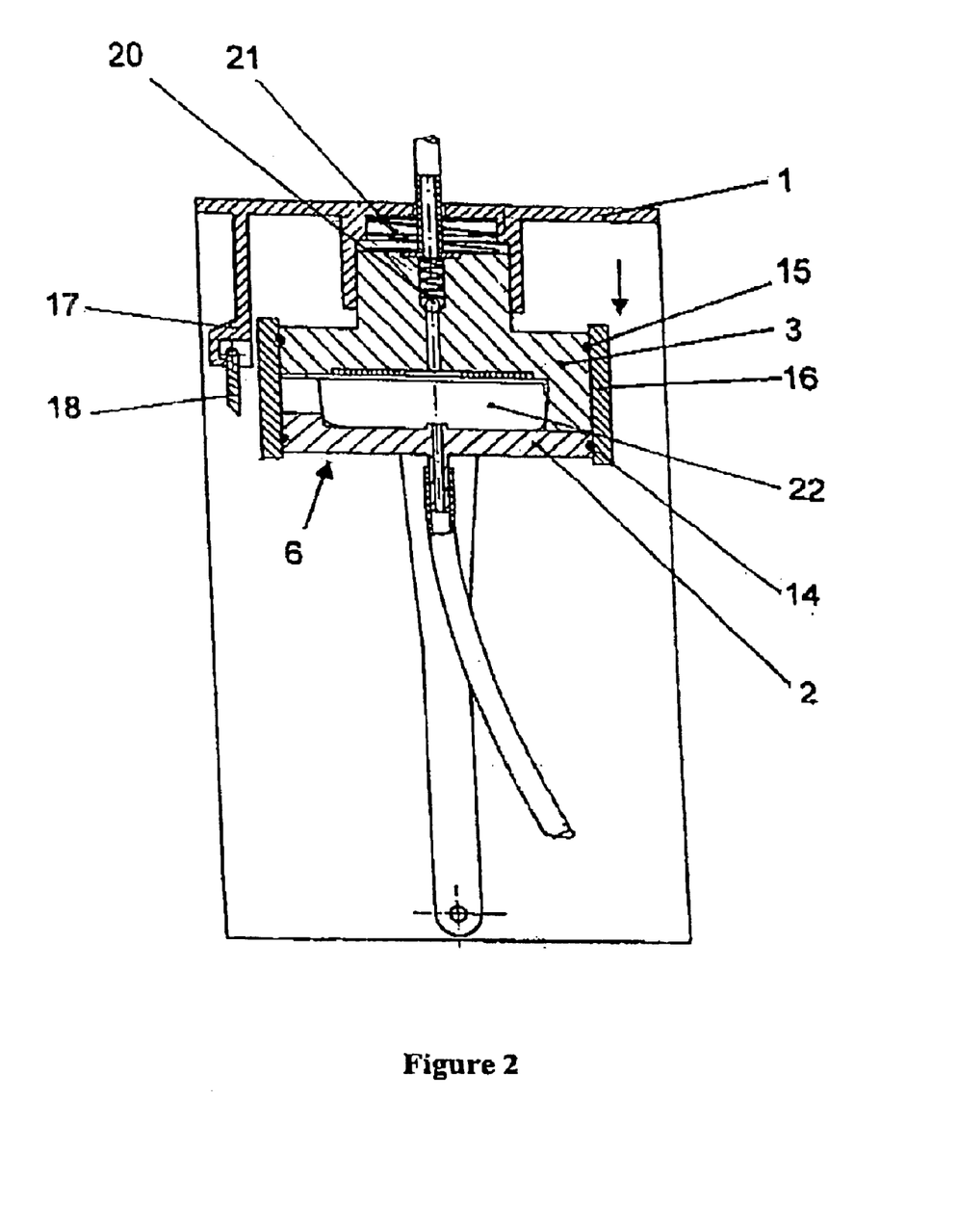
FIG. 2 is a sectional side view which shows the appliance of the present invention while the brewing chamber is in the closed position with the brewing chambers parts fitted together, the sleeve lowered for the seal, and the pouch positioned in the brewing chamber.
Figure 3:
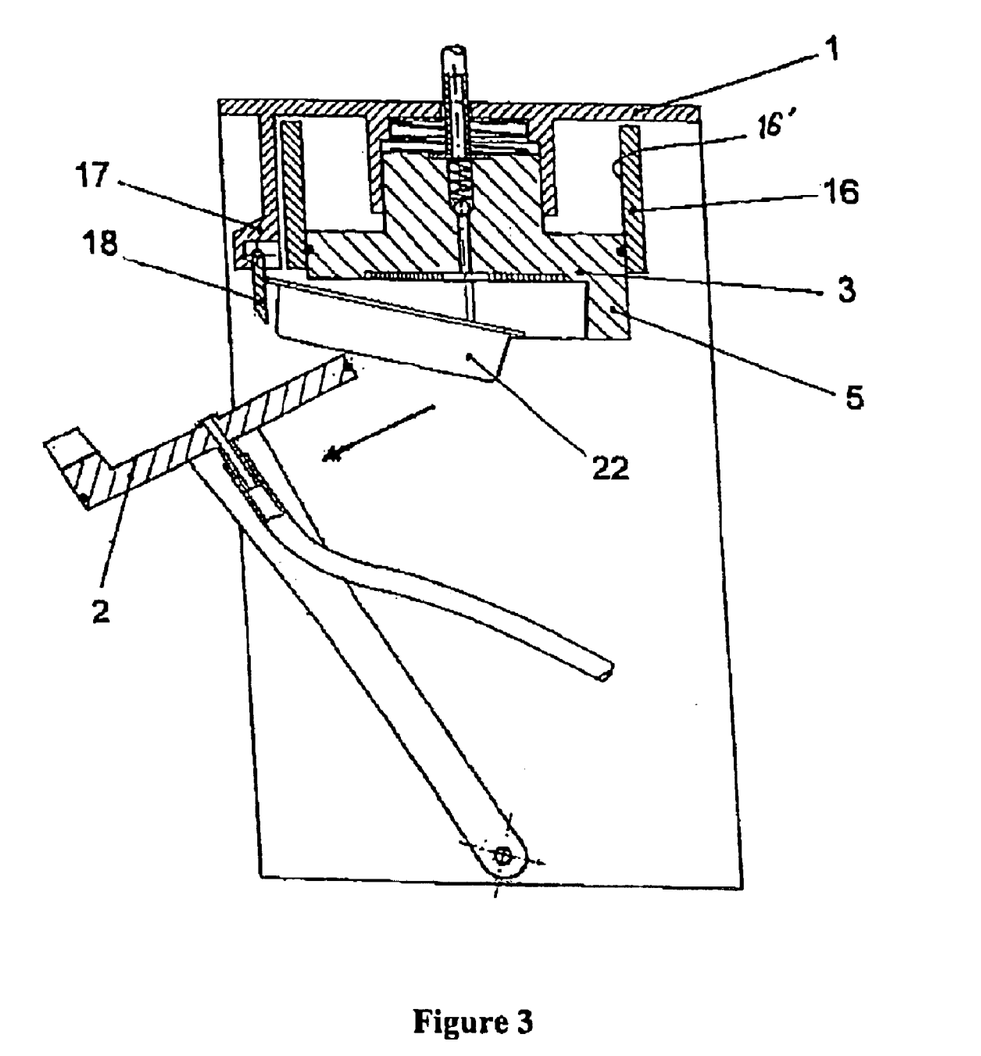
FIG. 3 is a sectional side view which shows the appliance of the present invention in the ejection position with separated brewing chamber parts, pulled up sleeve, and an ejected pouch.

Referring to FIGS. 1 to 3, there is shown an exemplary embodiment of the invention in which an appliance housing 1 supports a brewing chamber 6 having a lower movable chamber part 2 and an upper chamber part 3 that is guided in the appliance and can be fitted together with the lower part. Because the upper part 3 is guided and displaceable by a short way only in comparison to the motion of the movable chamber part 2 the upper part 3 is briefly called an immovable part. A modification of the brewing chamber may encompass a chamber part, particularly upper chamber part, that is immovably connected to the housing 1. The movable chamber part 2 functions to accommodate a portion container, such as a pouch 22, essentially made of a filtering material, which contains coffee grounds or another aromatic substance. The pouch 22 can be deposited on the lower movable chamber part 2, also called the receiving part, and can be pivoted together with this lower part in the direction of arrow 23 toward the upper chamber part 3 that is immovably connected to the housing 1. The upper chamber part is consequently closed off in the manner of a drawer containing the pouch, thus resulting in the closed position of the brewing chamber 6. The brewing chamber 6 can also be created with an analogously reversed design, in that the lower chamber part 2 of the brewing chamber 6 is guided in the appliance housing while the upper chamber part 3 is movable to insert the pouch 22 in the brewing chamber and to dispose it therefrom, respectively. A pivoting movement with a large pivoting radius is preferred for the movement of the two chamber parts 2 and 3. The movement can also be realized as horizontal, linear displacement of the two chamber parts.

Essentially, the modular unit forming the brewing chamber is shown while other sections of the appliance, in particular the area where brewing water is prepared and the water is supplied to the brewing chamber 1, as well as the area where the prepared brew is discharged from the brewing chamber to a holding container, are not shown herein.

Figure 4:
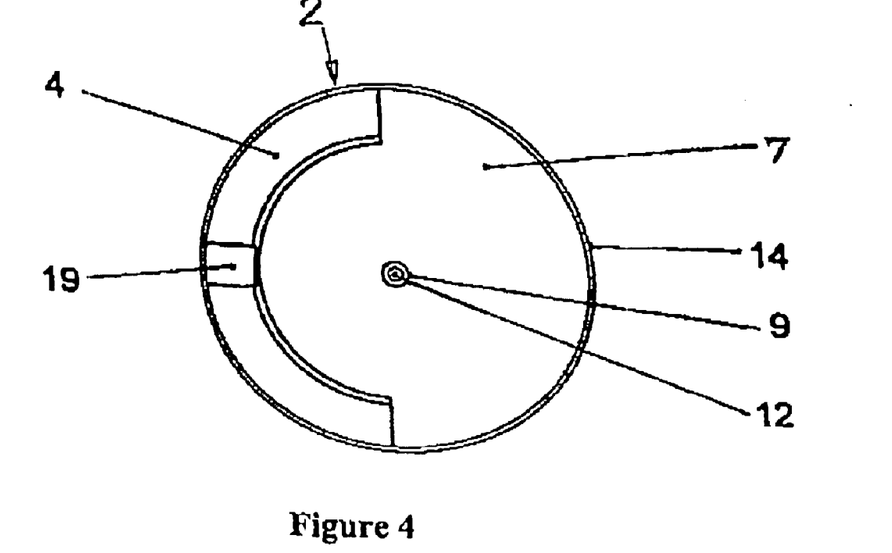
FIG. 4 shows the first chamber part, namely the lower movable chamber part, of the appliance of the present invention in a view from the above.

The lower movable chamber part 2 constitutes a first half 4 of the brewing chamber and is essentially designed in the form of a flat cylindrical section having an essentially circular inside surface 7 (see also FIG. 4) which is referred to as first inside and is planar with the exception of a central nub-shaped elevation 9 with brewing-water feed bore 12.

Figure 5:
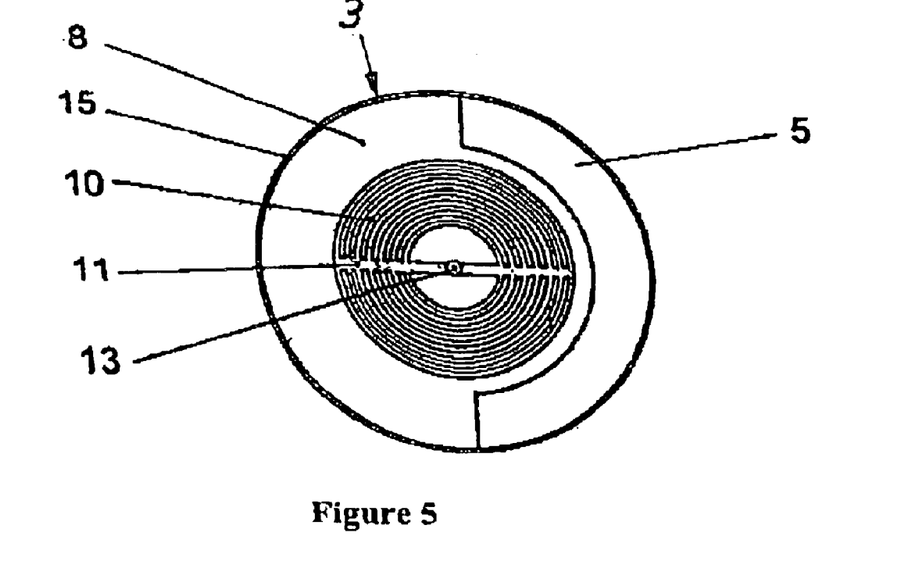
FIG. 5 shows the upper chamber part of the appliance of the present invention which is guided in the appliance housing in a view from below of its inside.

The second chamber part 3 that is guided in the appliance housing and functions as second half 5 of the brewing chamber is essentially designed in the form of a flat cylindrical section with the same outside diameter and a second, essentially planar inside surface 8, see FIG. 5. Annular grooves 10 are concentrically arranged on the inside surface 8 and are connected to a brew discharge line 13. The annular grooves are connected to a depression 11 in the second chamber part 3, where brew collects and which empties into the brew discharge line 13.

It should be mentioned here that instead of the above configuration, the first lower, movable chamber part can be provided with the annular grooves and the brew discharge line, and the second, upper chamber part can be designed with the brewing water feed bore.

Each of the two chamber parts 2 and 3 is provided with a sealing ring 14 and 15, respectively, in a closed cylindrical wall section.

Both sealing rings 14, 15 are suitable for forming circular seals together with a cylindrical inside surface of a vertically displaceable cylindrical sleeve 16 if the brewing chamber 6 is in the closed state, see FIG. 2.

The shape and dimensions of the chamber parts 2 and 3 are adapted to those of the pouch 22 such that the pouch 22 is aligned almost correctly and does not project over the first inside surface 7 and the second inside surface 8.

A scraper blade 18 that is attached pivotally to a support 17 projects downward from the support 17 at the locations shown in FIGS. 1–3. The scraper blade can be pivoted slightly in a counter-clockwise direction, but is prevented from pivoting in clockwise direction by coming to rest against an inside surface or end stop 17' of the support. The first, lower movable chamber part 2 is provided with an opening 19, with the scraper blade 18 being positioned therein in its movement path. The first, lower movable chamber part 2 thus can move unhindered past the scraper blade.

For the beverage preparation, the pouch 22 with the respective aromatic substance, in particular coffee, is placed onto the first, lower movable chamber part 2 and is roughly aligned thereon. Following this, the movable chamber part 2 can be pushed unhindered in the direction of arrow 23 to fit underneath the second chamber part that is guided in the appliance until the two chamber parts 2 and 3 are joined to form the brewing chamber 6.

FIG. 1 shows the opening position for the two chamber parts 2, 3, and/or the brewing chamber 6. The sleeve 16 is in the pushed-up position and does not hinder the movement of the first, movable chamber part 2.

The sleeve 16 is subsequently lowered to the position shown in FIG. 2 before brewing water is supplied to the brewing chamber, and the cylindrical inside surface 16' of the sleeve 16 slides over the sealing rings, first 15 and then 14. In the process, any impurities are automatically removed with the sleeve 16 from the sealing rings 14, 15. In the sealing position shown in FIG. 2, the brewing chamber 6 is sealed toward the outside at both sealing rings 14, 15.

During the subsequent feeding of brewing water through the brewing water feed bore 12, the brewing water is pushed reliably into the pouch 22 where it generates the coffee or beverage brew. The brew escapes almost exclusively in the region of the annular grooves 10 from the top of the pouch 22 and flows under pressure through the brew discharge line 13 to a collection container that is not shown herein.

The brewing process is optimized through the brewing chamber in which at least one of the first and second chamber parts 2 and 3 is axially displaceable when the brewing chamber is in the closed position. For example, as shown in FIG. 2, a spring 21 may be positioned between the outer surface of chamber part 3 and an inner surface of housing 1. The second, upper chamber part can then be displaced in an axial direction and counter to the force of spring 21. In the brewing process, the brewing chamber volume expands due to the brewing pressure in the brewing chamber so that the coffee grounds or other aromatic substance in the pouch can expand under the effect of the brewing water, which soaks through in a particularly uniform manner. It is also possible to position the spring so that the lower chamber part 2 is axially displaceable instead of or in combination with the second chamber part 3.

The brewing chamber expands until a spring-loaded frothing valve 20 positioned, for example, in discharge line 13 downstream of the brewing chamber 6. opens up. The inside pressure of the brewing chamber 6 then drops and the chamber parts 2 and 3 move toward each other in an axial direction as a result of the force of spring 21.

Following the completion of the brewing operation, the first movable chamber part 2 is moved back counter to the direction of arrow 23 to the open position, shown in FIG. 1, wherein the pouch 22 hits against the scraper blade 18 and drops down, as shown in FIG. 3, once the first movable chamber part is pivoted far enough back into the position shown in FIG. 1. The first, lower movable chamber part is then ready to accept a fresh pouch.

Figure 7:
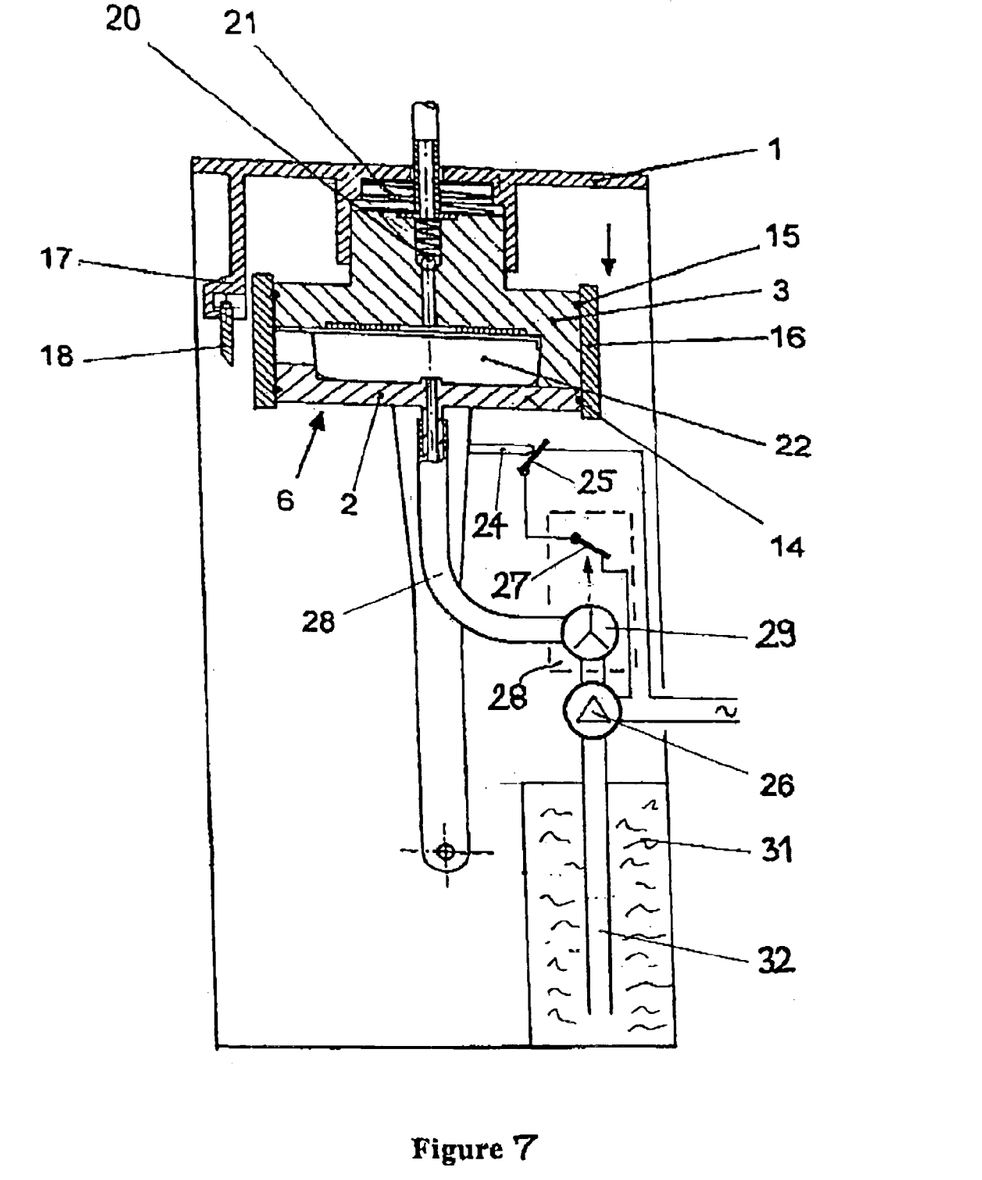
FIG. 7 is the first modification of the appliance in a position as shown in FIG. 2.

The first modification of the above embodiment comprises a safety device with an actuator arm 24 attached to the lower movable chamber part 2. The actuator arm 24 is adapted to actuate a normally open safety switch 25 which is attached to the appliance housing 1. The safety switch 25 is arranged in an electric circuit of a brewing-water pump 26. The safety switch 25 is open unless the brewing chamber 6 is completely closed as shown in FIG. 7. In the latter case the brewing-water pump can be energized subject to the position of an interrupter contact 27 which is an element of a programmable flow-trough control 28.

Further, in a box with dashed outlines representing the programmable flow-through control 28 a flow-meter 29 is shown which is arranged in a brewing-water conduit 30. The brewing water is fed from a water tank 31 through a brewing-water tube 32, the brewing-water pump 26, the flow-meter 29 and the brewing-water conduit 30 in the closed brewing chamber 6 according to FIG. 7 and when the interrupter contact 27 is closed pursuant a brewing command. When the flow-meter 29 samples the programmed quantity of brewing-water the interrupter contact 27 interrupts the circuit of the brewing water pump 26 and the brewing-water supply to the brewing chamber 6 is stopped.

Figure 6:
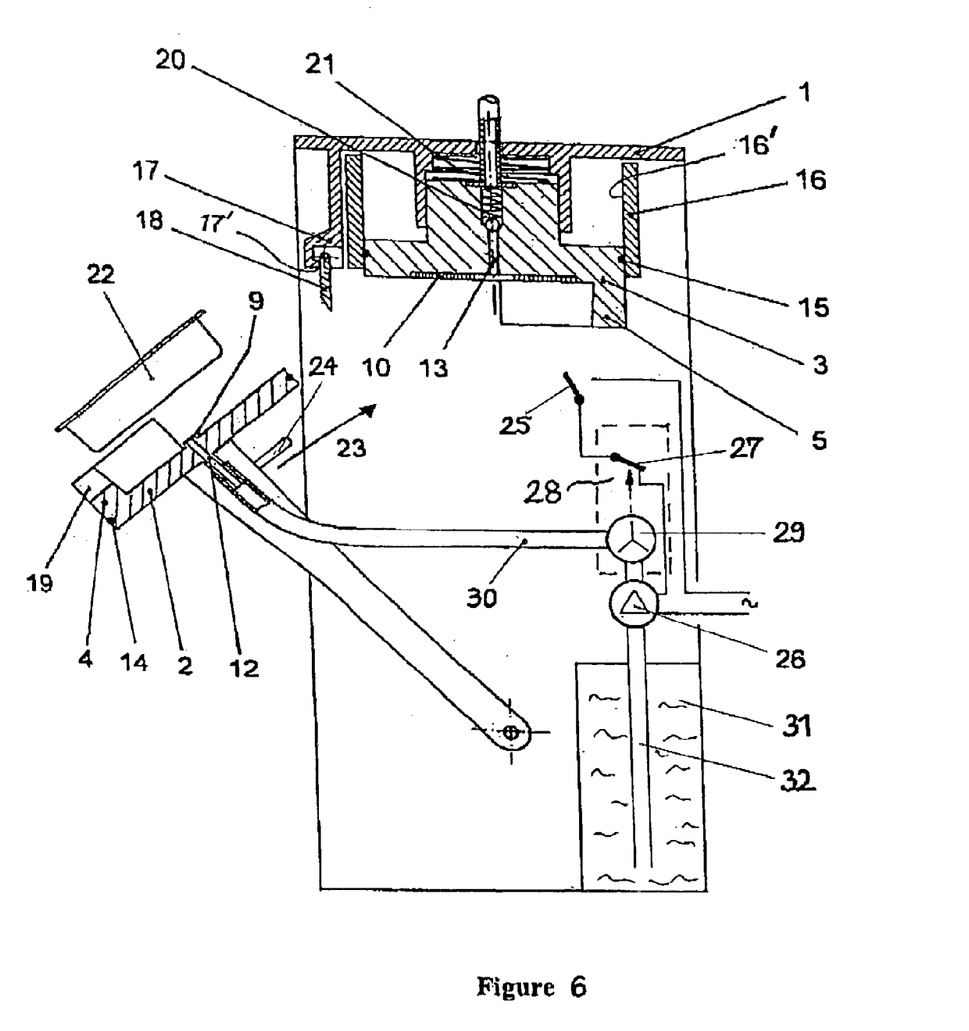
FIG. 6 is a first modification of the appliance in a position as shown in FIG. 1 wherein an actuator of a safety device is connected to the movable chamber part.
Figure 8:
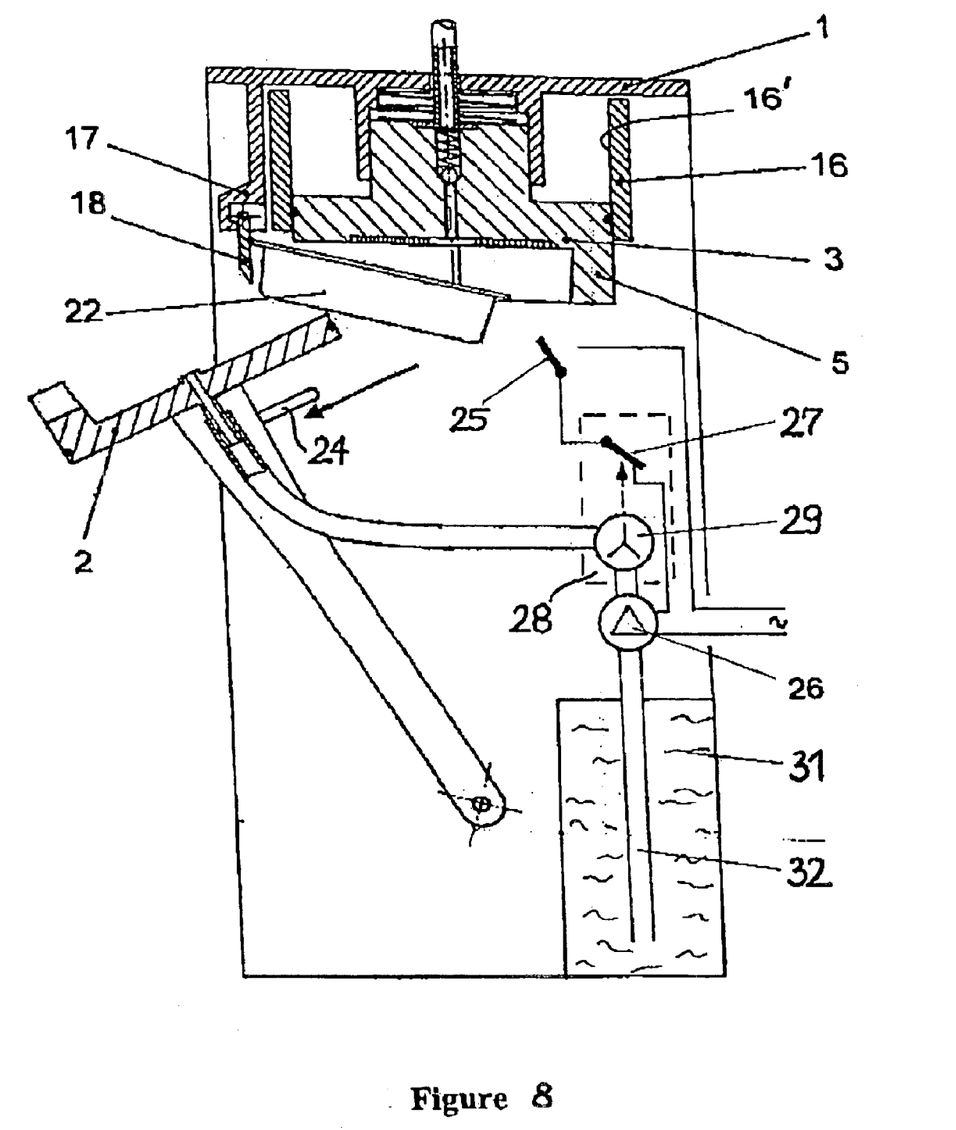
FIG. 8 is the first modification of the appliance in a position as shown in FIG. 3.
Figure 9:
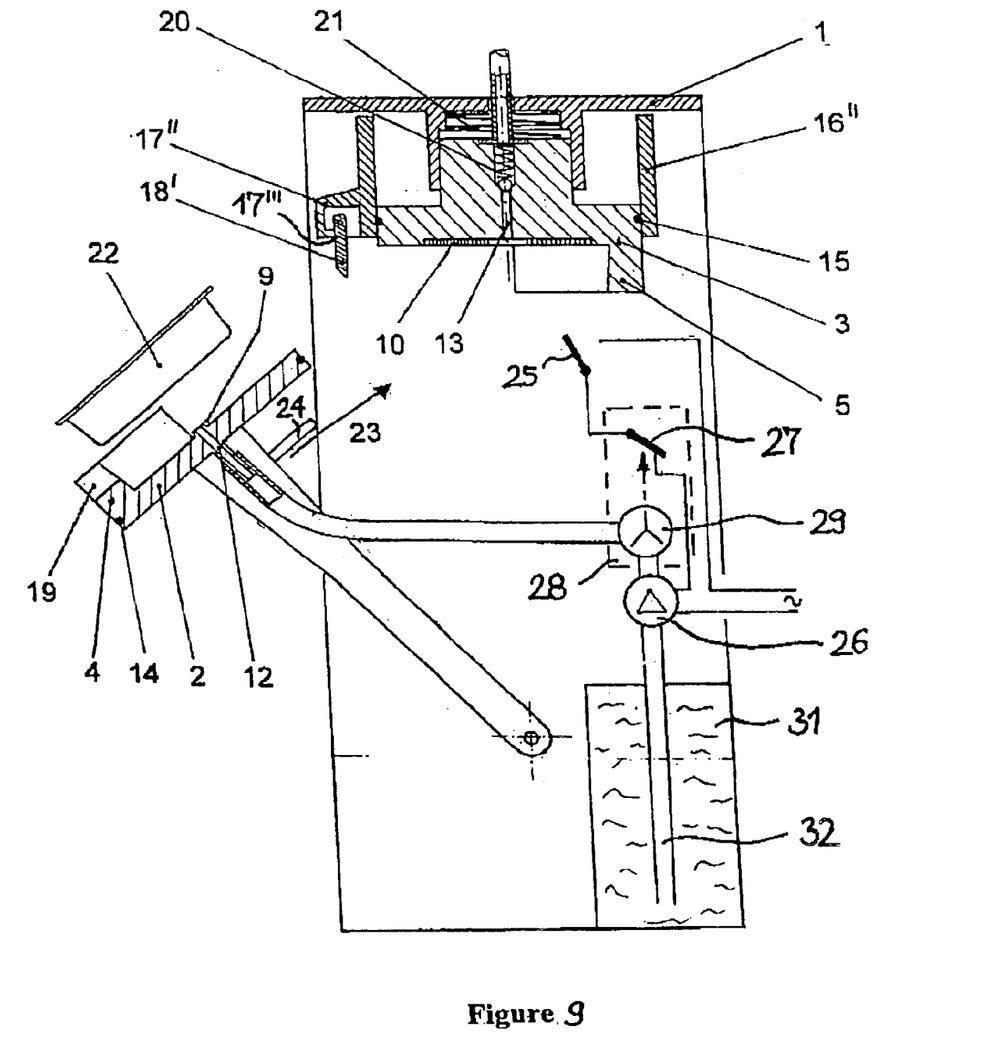
FIG. 9 is a second modification of the appliance in a position as shown in FIG. 1 wherein a scraper blade is positioned on the sleeve and an actuator of a safety device is connected to the movable chamber part.

The modification of the appliance according to FIG. 9 is different from the appliance according to FIGS. 6–8 as far as the position of the scraper blade 18' is concerned.

In FIG. 9 the scraper blade 18' is attached on the sleeve 16', more particularly on a support 17' thereof, which also includes an end stop 17'''. As the sleeve 16' is in its upper position when the brewing chamber is opened the scraper blade 18' is suited to scrape the pouch 22 from the lower movable chamber part 2 like the scraper blade 18 in FIG. 3.

The invention has been described in detail with respect to preferred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. An appliance for preparing hot beverages, comprising:
    a brewing chamber having an essentially cylindrical outside and at least two chamber parts, one of the chamber parts being movable relative to the other chamber part between a closed position and an opened position, the chamber parts holding a portion container in the closed position;
    a sleeve having an inside wall that is adapted to the essentially cylindrical outside of the brewing chamber; and
    at least two sealing rings for sealing the brewing chamber, each of the sealing rings encircling a respective one of the chamber parts;
    wherein the sleeve is pushable over the outside of the brewing chamber in the closed position, and each sealing ring provides a seal between the inside wall of the sleeve and the outside of the brewing chamber.

2. The appliance according to claim 1, wherein the movable chamber part is guided to be fitted together with the other chamber part in the closed position of the brewing chamber and to be separated from the other chamber part in the opened position of the brewing chamber and wherein the movable chamber part and the sleeve are linked, whereby in the closed position of the chamber parts the sleeve is pushed over at least the movable chamber part to create the seal.

3. The appliance according to claim 1, wherein each of the chamber parts has a circular cylindrical wall section on the outside into which a respective one of the sealing rings is inserted, and the inside wall of the sleeve is essentially cylindrical and smooth throughout.

4. The appliance according to claim 1, wherein the sealing rings are installed on the inside wall of the sleeve to form a composite sleeve to act jointly with the cylindrical wall sections of the chamber parts to form the seal.

5. The appliance according to claim 1, wherein the brewing chamber is divided, essentially in middle, into the movable chamber part and an immovable chamber part that is attached to the appliance, the movable chamber part forms a first half of the brewing chamber that comprises an essentially planar lower inside surface of the brewing chamber, and the immovable chamber part forms a second half of the brewing chamber that comprises an essentially planar upper inside surface of the brewing chamber.

6. The appliance according to claim 1, wherein the other of the chamber parts is immovable, and the sleeve is arranged to be pushed back along the immovable chamber part so that the movable chamber part is exposed and can be moved between the opened and closed positions.

7. The appliance according to claim 1, further comprising a scraper blade arranged in a movement region of the movable chamber part and being activatable to remove a used portion container from the movable chamber part when the movable chamber part is moved from the closed position to the opened position.

8. The appliance according to claim 7, and further comprising an appliance housing having a support and an end stop, wherein the scraper blade is attached to the support and is pivotable against the end stop.

9. The appliance according to claim 7, wherein the scraper blade is positioned on the sleeve and pivotable against an end stop.

10. The appliance according to claim 1, further comprising:

at least one nub-shaped elevation with a brewing water feed bore, wherein the nub-shaped elevation with the brewing water feed bore projects from an inside surface of one of the chamber parts.

11. The appliance according to claim 10, further including at least one brew discharge line, wherein annular grooves are concentrically arranged on an inside surface the other of the chamber parts and at a distance to an outer edge of the other chamber part, the annular grooves being connected to the at least one brew discharge line.

12. The appliance according to claim 1, further comprising a spring against which one of the chamber parts is pushed within the sleeve when the chamber parts are in the closed position, and a spring-loaded frothing valve coupled to the brewing chamber, wherein the one of the chamber parts is displaced relative to the other of the chamber part under pressure from brewing water in the brewing chamber and counter to the spring while the chamber parts are in the closed position until the frothing valve opens.

13. The appliance according to claim 1, further comprising: a safety device connected to at least one of the movable chamber part and the sleeve, wherein the safety device blocks feeding of brewing water into the brewing chamber when the brewing chamber is not completely closed and sealed.

14. The appliance according to claim 1, further comprising a programmable flow-through control for programming an amount of brewing water that flows through the brewing chamber.

* * * * *